United States Patent
Bell et al.

(10) Patent No.: US 10,781,377 B2
(45) Date of Patent: Sep. 22, 2020

(54) PROCESS AND APPARATUS FOR CRACKING HYDROCARBONS TO LIGHTER HYDROCARBONS

(71) Applicant: UOP LLC, Des Plaines, IL (US)

(72) Inventors: James M. Bell, Guildford (GB); Dharmesh C. Panchal, Surbiton (GB)

(73) Assignee: UOP LLC, Des Plaines, IL (US)

(*) Notice: Subject to any disclaimer, the term of this patent is extended or adjusted under 35 U.S.C. 154(b) by 84 days.

(21) Appl. No.: 15/827,912

(22) Filed: Nov. 30, 2017

(65) Prior Publication Data
US 2019/0161686 A1 May 30, 2019

(51) Int. Cl.
*C10G 11/18* (2006.01)
*B01J 8/18* (2006.01)
*B01J 8/00* (2006.01)

(52) U.S. Cl.
CPC .......... *C10G 11/182* (2013.01); *B01J 8/0055* (2013.01); *B01J 8/1845* (2013.01); *B01J 8/1872* (2013.01); *B01J 8/1881* (2013.01); *C10G 2300/1037* (2013.01); *C10G 2300/4093* (2013.01); *C10G 2300/701* (2013.01)

(58) Field of Classification Search
CPC .......... C10G 11/182; C10G 2300/4093; C10G 2300/1037; C10G 2300/701; B01J 8/1881; B01J 8/0055; B01J 8/1872; B01J 8/1845
See application file for complete search history.

(56) References Cited

U.S. PATENT DOCUMENTS

| | | | |
|---|---|---|---|
| 5,372,704 A | 12/1994 | Harandi et al. | |
| 6,063,263 A | 5/2000 | Palmas | |
| 7,135,151 B1 | 11/2006 | Palmas | |
| 7,153,478 B2 | 12/2006 | Xu et al. | |
| 7,312,370 B2 | 12/2007 | Pittman et al. | |
| 9,234,143 B2 | 1/2016 | Xie et al. | |
| 9,816,037 B2 | 11/2017 | Avais | |
| 2008/0011645 A1* | 1/2008 | Dean | C10G 11/182 208/113 |
| 2013/0172173 A1* | 7/2013 | Mukthiyar | B01J 38/30 502/41 |
| 2018/0161743 A1* | 6/2018 | McCarthy | C10G 3/49 |

FOREIGN PATENT DOCUMENTS

WO    2005080531 A1    9/2005

* cited by examiner

*Primary Examiner* — Randy Boyer
*Assistant Examiner* — Juan C Valencia
(74) *Attorney, Agent, or Firm* — Paschall & Associates, LLC; James C. Paschall

(57) ABSTRACT

A process and apparatus for catalytically cracking fresh heavy hydrocarbon feed to produce cracked products is disclosed. A fraction of the cracked products can be obtained to re-crack it in a downer reactor. The downer reactor may produce high selectivity to light olefins. Spent catalyst from both reactors can be regenerated in the same regenerator.

5 Claims, 1 Drawing Sheet

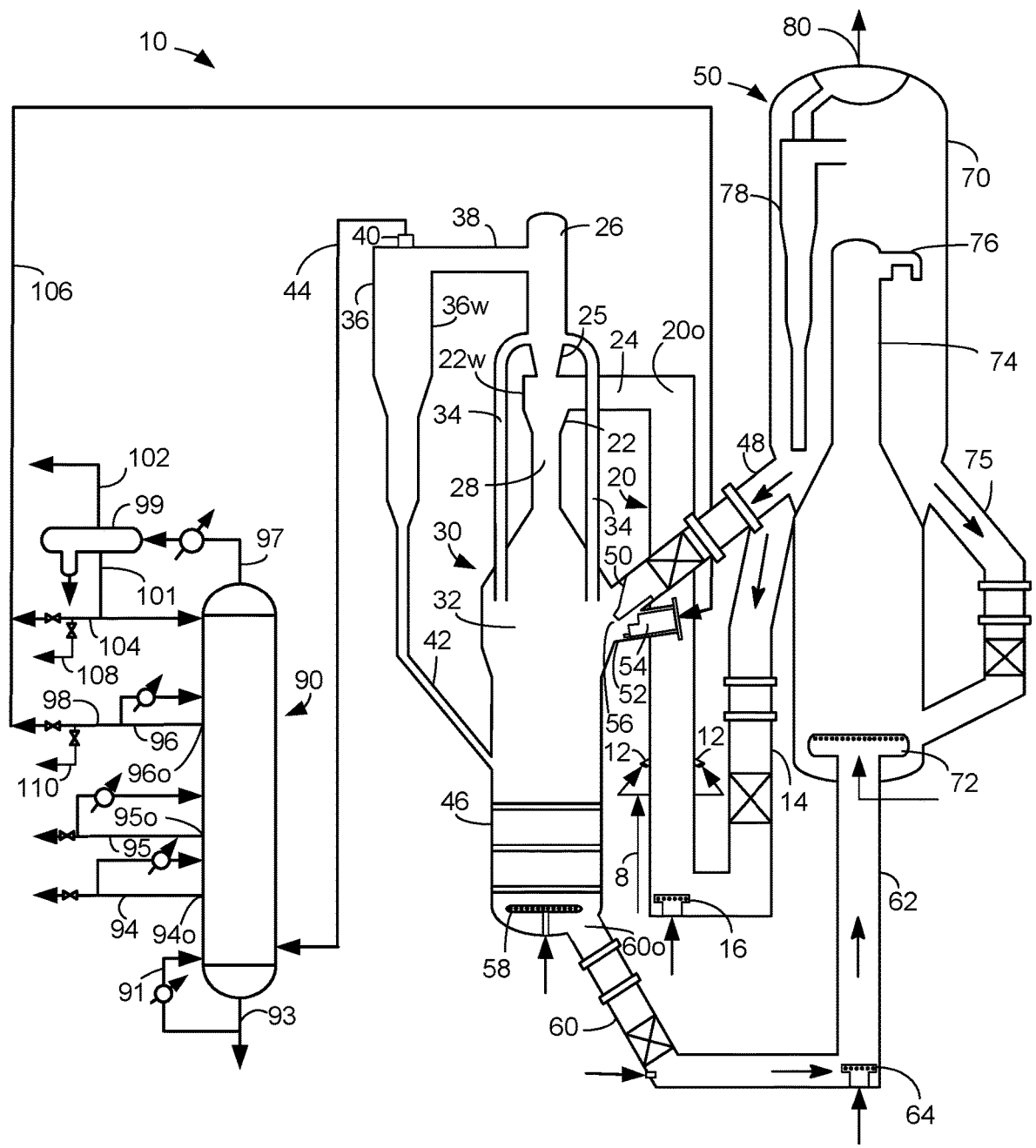

PROCESS AND APPARATUS FOR CRACKING HYDROCARBONS TO LIGHTER HYDROCARBONS

FIELD

The field is fluid catalytic cracking (FCC) of hydrocarbons.

BACKGROUND

FCC technology, now more than 50 years old, has undergone continuous improvement and remains the predominant source of gasoline production in many refineries. This gasoline, as well as lighter products, is formed as the result of cracking heavier, less valuable hydrocarbon feed stocks such as gas oil.

Fluid catalytic cracking (FCC) is a catalytic hydrocarbon conversion process accomplished by contacting heavier hydrocarbons in a fluidized reaction zone with a catalytic particulate material. The reaction in catalytic cracking, as opposed to hydrocracking, is carried out in the absence of substantial added hydrogen or the consumption of hydrogen. As the cracking reaction proceeds substantial amounts of highly carbonaceous material referred to as coke are deposited on the catalyst to provide coked or spent catalyst. Vaporous lighter products are separated from spent catalyst in a reactor vessel. Spent catalyst may be subjected to stripping over an inert gas such as steam to strip entrained hydrocarbonaceous gases from the spent catalyst. A high temperature regeneration with oxygen within a regeneration zone operation burns coke from the spent catalyst which may have been stripped. Various products may be produced from such a process, including a naphtha product and/or a light product such as propylene and/or ethylene.

Processes and apparatuses for contacting FCC catalyst with feed for very short contact periods include falling-curtain type arrangements for contacting feed for a contact time of less than 1 second followed by a quick separation. The ultra-short contact time system improves selectivity to gasoline while decreasing coke and dry gas production by using high-activity, zeolitic catalyst that previously contacted the feed for a relatively short period of time.

Improved processes and apparatuses are desired for production of light olefins by catalytic cracking.

SUMMARY

We have discovered a process and apparatus for catalytically cracking fresh heavy hydrocarbon feed to produce cracked products. A second hydrocarbon feed which could be a fraction of the cracked products can be recovered to re-crack it in a downer reactor. The downer reactor may produce a lighter product with a high selectivity to light olefins.

Additional features and advantages of the invention will be apparent from the description of the invention, FIGURE and claims provided herein.

BRIEF DESCRIPTION OF THE DRAWING

The FIGURE is a schematic drawing of an FCC unit.

DEFINITIONS

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "direct communication" means that flow from the upstream component enters the downstream component without undergoing a compositional change due to physical fractionation or chemical conversion.

The term "indirect communication" means that flow from the upstream component enters the downstream component after undergoing a compositional change due to physical fractionation or chemical conversion.

The term "bypass" means that the object is out of downstream communication with a bypassing subject at least to the extent of bypassing.

As used herein, the term "boiling point temperature" means atmospheric equivalent boiling point (AEBP) as calculated from the observed boiling temperature and the distillation pressure, as calculated using the equations furnished in ASTM D1160 appendix A7 entitled "Practice for Converting Observed Vapor Temperatures to Atmospheric Equivalent Temperatures".

As used herein, the term "True Boiling Point" (TBP) means a test method for determining the boiling point of a material which corresponds to ASTM D-2890 for the production of a liquefied gas, distillate fractions, and residuum of standardized quality on which analytical data can be obtained, and the determination of yields of the above fractions by both mass and volume from which a graph of temperature versus mass % distilled is produced using fifteen theoretical plates in a column with a 5:1 reflux ratio.

As used herein, the term "T5" or "T95" means the temperature at which 5 mass percent or 95 mass percent, as the case may be, respectively, of the sample boils using ASTM D-86 or TBP.

As used herein, the term "initial boiling point" (IBP) means the temperature at which the sample begins to boil using ASTM D-7169, ASTM D-86 or TBP, as the case may be.

As used herein, the term "end point" (EP) means the temperature at which the sample has all boiled off using ASTM D-7169, ASTM D-86 or TBP, as the case may be.

As used herein, "vacuum gas oil" means a hydrocarbon material having an IBP of at least about 232° C. (450° F.), a T5 of about 288° C. (550° F.) and about 390° C. (700° F.), typically no more than about 343° C. (650° F.), a T95 between about 510° C. (950° F.) and about 570° C. (1058° F.) and, or an EP of no more than about 626° C. (1158° F.) prepared by vacuum fractionation of atmospheric as determined by any standard gas chromatographic simulated distillation method such as ASTM D2887, D6352 or D7169, all of which are used by the petroleum industry.

As used herein, "atmospheric residue" means a hydrocarbon material having an IBP of at least about 232° C. (450° F.), a T5 of about 288° C. (550° F.) and about 390° C. (700° F.), typically no more than about 343° C. (650° F.), and a T95 between about 510° C. (950° F.) and about 700° C. (1290° F.) obtained from the bottoms of an atmospheric crude distillation column.

As used herein, "vacuum residuum" means the hydrocarbon material boiling with an IBP of at least 500° C. (932° F.).

As used herein, "heavy vacuum gas oil" means the hydrocarbon material boiling in the range between about 427° C. (800° F.) and about 538° C. (975° F.) AEBP as determined by any standard gas chromatographic simulated distillation method such as ASTM D2887, D6352 or D7169, all of which are used by the petroleum industry.

As used herein, the term "separator" means a vessel which has an inlet and at least an overhead vapor outlet and a bottoms liquid outlet and may also have an aqueous stream outlet from a boot. A flash drum is a type of separator which may be in downstream communication with a separator that may be operated at higher pressure.

As used herein, the term "predominant" or "predominate" means greater than 50%, suitably greater than 75% and preferably greater than 90%.

DETAILED DESCRIPTION

The process and apparatus proposed use a riser reactor to initially crack a fresh heavy hydrocarbon feed stream. A lighter hydrocarbon feed stream which may be a fraction of the cracked heavy hydrocarbon feed stream is further cracked in downer type of catalytic cracking reactor to achieve greater yield of light olefins. The two reactors may use the same catalyst composition and may be fed with regenerated catalyst from a common regenerator.

The FIGURE, wherein like numerals designate like components, illustrates an apparatus and process 10 that is equipped for processing a fresh hydrocarbon feed stream. The apparatus and process 10 generally include a riser reactor 20, a downer reactor 30, a regenerator 50, and a main fractionation column 90.

The riser reactor 20 may comprise a vertical pipe. A fresh hydrocarbon feed stream in a fresh feed line 8 may be distributed to the riser reactor 20 through one or more feed distributor(s) 12. A conventional FCC feedstock and a higher boiling hydrocarbon feedstock are suitable fresh hydrocarbon feed streams. The most common of such conventional fresh hydrocarbon feedstocks is a "vacuum gas oil" (VGO), which is typically a hydrocarbon material having a boiling range with an IBP of at least about 232° C. (450° F.), a T5 of at least about 288° C. (550° F.) to about 343° C. (650° F.), a T95 between about 510° C. (950° F.) and about 570° C. (1058° F.) and an EP of no more than about 626° C. (1158° F.) prepared by vacuum fractionation of atmospheric residue. Such a fraction is generally low in coke precursors and heavy metal contamination which can serve to contaminate catalyst. Atmospheric residue is a suitable feedstock boiling with an IBP of at least about 315° C. (600° F.), a T5 between about 340° C. (644° F.) and about 360° C. (680° F.) and a T95 of between about 700° C. (1290° F.) and about 900° C. (1652° F.) obtained from the bottoms of an atmospheric crude distillation column. Atmospheric residue is generally high in coke precursors and metal contamination. Other heavy hydrocarbon feedstocks which may serve as a fresh hydrocarbon feed stream include heavy bottoms from crude oil, heavy bitumen crude oil, shale oil, tar sand extract, deasphalted residue, products from coal liquefaction, and vacuum reduced crudes. Fresh hydrocarbon feedstocks also include mixtures of the above hydrocarbons and the foregoing list is not exhaustive.

A first regenerated catalyst conduit 14 is connected to the riser 20. In the riser 20, a first stream of regenerated catalyst may be transported in a first regenerated catalyst conduit 14 from the regenerator 70 through a control valve and a u-bend or a wye and be lifted by an inert gas, such as steam, from a lift gas distributor 16. The inert gas lifts the first stream of regenerated catalyst up to contact the fresh heavy hydrocarbon feed stream from line 8 through the one or more feed distributor(s) 12. The fresh hydrocarbon feed stream contacts the upwardly rising first stream of regenerated catalyst. Heat from the regenerated catalyst vaporizes the fresh hydrocarbon feed stream which upon contact with the catalyst cracks large hydrocarbon molecules to smaller hydrocarbon molecules to produce a cracked hydrocarbon stream. During this contact, coke is generated on the catalyst to produce a first spent catalyst stream as both the cracked hydrocarbon stream and the spent catalyst stream are transported up the riser 20 as a mixture.

The mixture of cracked hydrocarbon products and spent catalyst in the riser 20 may be discharged from a riser outlet 20o into a disengager 22. A tangentially disposed inlet duct 24 may be connected to the disengager 22 at one end and to the riser outlet 20o at another end. In an aspect, the inlet duct 24 may transport the mixture from the riser 20 into the disengager 22. The disengager 22 is connected to an upper end of the riser 20 for disengaging cracked products from spent catalyst.

The disengager 22 comprises a cylindrical wall 22w and the inlet duct 24 may be disposed tangentially to the cylindrical wall so as to discharge the mixture tangentially into the disengager 22 to induce centrifugal separation of a first spent catalyst stream from the gaseous cracked hydrocarbon stream.

The gaseous cracked hydrocarbon stream rises from the disengager upwardly through a downwardly tapered gas conduit 25 into a plenum 26 and the first spent catalyst stream descends downwardly through a down corner 28 into a reactor chamber 32 of a downer reactor 30. The reactor chamber 32 is disposed below the disengager 22. Vent tubes 34 running between the plenum 26 and the reactor chamber 32 equalize pressure between the two vessels. The plenum 26 collects the cracked products above the disengager 22.

A cyclone 36 may be fed with the cracked product stream from the plenum through an entry conduit 38. The entry conduit 38 may be connected to the plenum 26 at one end and is tangentially connected to the cyclone 36 at another end. The cyclone 36 comprises a cylindrical wall 36w and the entry conduit 38 may be disposed tangentially to the cylindrical wall 36w so as to discharge the cracked product stream tangentially into the cyclone 36 to induce centrifugal separation of a cracked product stream to further remove spent catalyst particles from the gaseous cracked hydrocarbon stream. The further purified cracked product stream exits the cyclone 36 in a product vent 40 and a dip leg 42 transports spent catalyst particles to the reactor chamber 32. The dip leg 42 is connected to the reactor chamber 32. One or more internal or external cyclone(s) 36 may be utilized.

The riser reactor 20 can operate at any suitable temperature, and typically operates at a temperature of about 150° to about 580° C., preferably about 520° to about 580° C. at the riser outlet 20o. In one exemplary embodiment, a higher riser temperature may be desired, such as no less than about 565° C. at the riser outlet 20o and a pressure of from about 69 kPa (gauge) (10 psig) to about 517 kPa (gauge) (75 psig) but typically less than about 275 kPa (gauge) (40 psig). The catalyst-to-oil ratio, based on the weight of catalyst and feed hydrocarbons entering the bottom of the riser, may range up to 30:1 but is typically between about 4:1 and about 25:1 and may range between 7:1 and 15:1. Hydrogen is not normally added to the riser. Steam may be passed into the riser reactor 12 equivalent to about 2-35 wt-% of feed. Typically, however, the steam rate may be between about 2 and about 7 wt-% for maximum gasoline production and about 10 to about 15 wt-% for maximum light olefin production. The average residence time of catalyst in the riser may be less than about 5 seconds.

The catalyst in the riser reactor 20 can be a single catalyst or a mixture of different catalysts. Usually, the catalyst includes two components or catalysts, namely a first component or catalyst, and a second component or catalyst. Such a catalyst mixture is disclosed in, e.g., U.S. Pat. No. 7,312,370 B2. Generally, the first component may include any of the well-known catalysts that are used in the art of FCC, such as an active amorphous clay-type catalyst and/or a high activity, crystalline molecular sieve. Zeolites may be used as molecular sieves in FCC processes. Preferably, the first component includes a large pore zeolite, such as a Y-type zeolite, an active alumina material, a binder material, including either silica or alumina, and an inert filler such as kaolin.

Typically, the zeolitic molecular sieves appropriate for the first component have a large average pore size. Usually, molecular sieves with a large pore size have pores with openings of greater than about 0.7 nm in effective diameter defined by greater than about 10, and typically about 12, member rings. Suitable large pore zeolite components may include synthetic zeolites such as X and Y zeolites, mordenite and faujasite. A portion of the first component, such as the zeolite, can have any suitable amount of a rare earth metal or rare earth metal oxide.

The second component may include a medium or smaller pore zeolite catalyst, such as a MFI zeolite, as exemplified by at least one of ZSM-5, ZSM-11, ZSM-12, ZSM-23, ZSM-35, ZSM-38, ZSM-48, and other similar materials. Other suitable medium or smaller pore zeolites include ferrierite, and erionite. Preferably, the second component has the medium or smaller pore zeolite dispersed on a matrix including a binder material such as silica or alumina and an inert filler material such as kaolin. The second component may also include some other active material such as beta zeolite. These compositions may have a crystalline zeolite content of about 10 to about 50 wt-% or more, and a matrix material content of about 50 to about 90 wt-%. Components containing about 40 wt-% crystalline zeolite material are preferred, and those with greater crystalline zeolite content may be used. Generally, medium and smaller pore zeolites are characterized by having an effective pore opening diameter of less than or equal to about 0.7 nm and rings of about 10 or fewer members. Preferably, the second catalyst component is an MFI zeolite having a silicon-to-aluminum ratio greater than about 15, preferably greater than about 75. In one exemplary embodiment, the silicon-to-aluminum ratio can be about 15:1 to about 35:1.

The total catalyst mixture in the riser reactor 20 may contain about 1 to about 25 wt-% of the second component, including a medium to small pore crystalline zeolite with greater than or equal to about 7 wt-% of the second component being preferred. When the second component contains about 40 wt-% crystalline zeolite with the balance being a binder material, an inert filler, such as kaolin, and optionally an active alumina component, the catalyst mixture may contain about 0.4 to about 10 wt-% of the medium to small pore crystalline zeolite with a preferred content of at least about 2.8 wt-%. The first component may comprise the balance of the catalyst composition. In some preferred embodiments, the relative proportions of the first and second components in the mixture may not substantially vary throughout the riser reactor 20. The high concentration of the medium or smaller pore zeolite as the second component of the catalyst mixture can improve selectivity to light olefins. In one exemplary embodiment, the second component can be a ZSM-5 zeolite and the catalyst mixture can include about 0.4 to about 10 wt-% ZSM-5 zeolite excluding any other components, such as binder and/or filler.

The cracked product stream in vent 40 may be transported in a product line 44 to the FCC main fractionation column 90. The main fractionation column 90 is in downstream communication with the disengager 22. The gaseous cracked product stream in the product line 44 is fed to a lower half of an FCC main fractionation column 90. The main fractionation column 90 is in downstream communication with the riser reactor 20. The main fractionation column 90 fractionates the cracked hydrocarbon stream into several fractions. Several fractions may be separated and taken from the main fractionation column 90 including a heavy slurry oil stream from a bottoms line 93, a HCO stream in lower side line 94, a LCO stream in a middle side line 95 and a heavy naphtha stream in an upper side line 98. A portion of the heavy naphtha stream in the upper side line 98 may be recovered as heavy naphtha product for gasoline pool or for further processing in a naphtha product line 110 while another portion of the heavy naphtha stream in the upper side line 98 may be taken and recycled as naphtha feed to the reactor in a recycle line 106.

Gasoline and gaseous light hydrocarbons are removed in an overhead line 97 from the main fractionation column 90 and condensed before entering a main column receiver 99. An aqueous stream is removed from a boot in the receiver 99. Moreover, a condensed unstabilized, light naphtha stream is removed in a receiver bottoms line 101 while a net gaseous light hydrocarbon stream is removed in a net overhead line 102. A portion of the light naphtha stream in bottoms line 101 may be refluxed to the main fractionation column 90 while a net overhead liquid stream comprising light naphtha may be collected in a net overhead liquid line 104. A portion of the net overhead liquid stream in the net overhead liquid line 104 may be taken for processing in a vapor recovery section (not shown) for the recovery of light olefins in a light recovery line 108 while another portion of the net overhead liquid stream may be taken and recycled as naphtha feed to the downer reactor 30 in recycle line 106. The net gaseous light hydrocarbon stream in the net overhead line 102 may also enter a vapor recovery section (not shown) downstream of the main fractionation column 90 for the recovery of light olefins. The recycle stream in recycle line 106 may be taken from one or both of the heavy naphtha stream in line 98 and the light naphtha in the net liquid overhead stream in net overhead liquid line 104. It is also contemplated that the recycle stream in recycle line 106 may be taken from the vapor recovery section (not shown) which processes the portion of the net overhead liquid stream in the light recovery line 108 and/or the net gaseous light hydrocarbon stream in the net overhead line 102 or from another external source.

The main fractionation column 90 fractionates the cracked hydrocarbon stream to produce a second hydrocarbon feed stream in the recycle line 106. The second hydrocarbon feed stream in the recycle line 106 may have a lower boiling point range than the fresh hydrocarbon feed stream in the fresh feed line 8. The second hydrocarbon feed stream may comprise $C_5$ to $C_{10}$ hydrocarbons.

The light unstabilized naphtha fraction preferably has an initial boiling point (IBP) in the $C_5$ range; i.e., between about 0° C. (32° F.) and about 35° C. (95° F.), and an end point (EP) at a temperature greater than or equal to about 127° C. (260° F.). The optional heavy naphtha fraction has an IBP just above about 127° C. (260° F.) and an EP at a temperature above about 204° C. (400° F.), preferably between about 200° C. (390° F.) and about 221° C. (430° F.). The LCO stream has an IBP in the $C_5$ range if no heavy naphtha cut is taken or at about the EP temperature of the heavy naphtha if a heavy naphtha cut is taken and an EP in a range of about 360° C. (680° F.) to about 382° C. (720° F.). The LCO stream may have a T5 in the range of about 213° C. (416° F.) to about 244° C. (471° F.) and a T95 in the range of about 354° C. (669° F.) to about 377° C. (710° F.). The HCO stream has an IBP just above the EP temperature of the LCO stream and an EP in a range of about 385° C. (725° F.) to about 427° C. (800° F.). The HCO stream may have a T5 in the range of about 332° C. (630° F.) to about 349° C. (660° F.) and a T95 in the range of about 382° C. (720° F.) to about 404° C. (760° F.). The heavy slurry oil stream has an IBP just above the EP temperature of the HCO stream and includes everything boiling at a higher temperature. A portion of the slurry oil stream in line 93 may be cooled and recycled in line 91 back to the main fractionation column 90.

Any or all of lines 94-96 may be cooled and pumped back to the main column 90 typically at a higher location. Specifically, a side stream may be taken from an outlet 94o, 95o or 96o in the side of the main fractionation column 90. The side stream may be cooled and returned to the main fractionation column 90 to cool the main fractionation column 90. A heat exchanger may be in downstream communication with the side outlet 94o, 95o or 96o. A heavy naphtha stream in line 96 may be returned to the main fractionation column 90 after cooling while a heavy naphtha product stream is taken in line 98. Gasoline may also be recovered from the light naphtha stream in the light recovery line 108 and the naphtha recovery line 110.

The naphtha stream in the recycle line 106 may be fed to the downer reactor 30 as a second hydrocarbon feed stream. The downer reactor 30 may comprise the chamber 32, a stripping section 46 and the disengager 22. A second stream of regenerated catalyst in a second regenerated catalyst conduit 48 passes through a control valve and enters the reactor 30 through a catalyst nozzle 50 which typically communicates with the end of the second regenerated catalyst conduit 48. The second regenerated catalyst conduit 48 is connected with the reactor chamber 32 for delivering the second regenerated catalyst stream to the chamber.

The second hydrocarbon feed stream passes through a feed nozzle 52 and is fed to the reactor chamber 32 through a second feed distributor 54. Specifically, the catalyst nozzle 50 generates a falling stream of catalyst that meets and contacts the second hydrocarbon feed distributed by the second feed distributor 54 in a contacting cavity 56 in a periphery of the reactor chamber 32. After or simultaneously with the contact between the second hydrocarbon feed stream and the falling stream of catalyst particles in the second regenerated catalyst stream, the naphtha range hydrocarbons crack to produce lighter hydrocarbons including light olefins and spent catalyst. A mixture of a light hydrocarbons and spent catalyst move from the contacting section 56 into the reactor chamber 32 of larger volume and tend to expand and rapidly disengage into a light hydrocarbon stream and a second spent catalyst stream. In the reactor chamber 32, dilute phase conditions exist comprising a catalyst density of between about 16 kg/m³ (1 lb/ft³) and about 80 kg/m³ (5 lb/ft³). Dilute phase conditions exist in all of the downer reactor 30 above the reactor chamber 32. The second spent catalyst stream gravitates downwardly into the stripping section 46 while a vaporous light hydrocarbon stream tends to rise through vent pipes 34 bypassing the disengager 22 in the vent pipes which transport the light hydrocarbon stream to the plenum 26 above the tapered gas conduit 25. The light hydrocarbon stream entering the plenum 26 is processed with the cracked product stream in the product line 44 and is fractionated in the main fractionation column 90 to provide light olefins in the net overhead line 102 and the light recovery line 108.

The ratio of catalyst to oil in the downer reactor is about 5 to about 20 and is biased toward the production of light olefins. Contact time between the second regenerated catalyst and the second hydrocarbon feed stream is less than 1 second. The temperature in the downer reactor 30 is between about 482° C. (900° F.) and 593° C. (1100° F.).

The second spent catalyst stream mixes with a first spent catalyst stream descending from the disengager 22, the vent tubes 34 and the dip leg 42 to provide a mixed spent catalyst stream. The mixed spent catalyst stream leaves the reactor chamber 32 to enter the stripping section 46 in which a dense phase of catalyst forms. Dense phase conditions are characterized by an apparent bulk density of the catalyst in a range of from 240 kg/m³ (15 lb/ft³) to about 800 kg/m³ (50 lb/ft³). The stripping section 46 is at a bottom reactor chamber 32 between the catalyst nozzle 50 for the second regenerated catalyst conduit 48 and the reactor chamber 32 and a spent catalyst outlet 60o for the mixed spent catalyst. The stripping section 46 may include baffles, packing or grates to facilitate stripping of volatile hydrocarbons from the mixed spent catalyst stream with an inert gas such as steam distributed from a distributor 58. Stripped spent catalyst may exit through the spent catalyst outlet 60o, descend down a spent catalyst conduit 60, through a control valve and be transported with the help of fluidizing gas over to a regenerator riser 62. An air lift gas distributor 64 lifts the spent catalyst up the regenerator riser 62 and into the regenerator 70 through a spent catalyst distributor 72 after additional air is added to the spent catalyst.

Inevitable side reactions occur in catalytic cracking in the riser 20 and the reactor chamber 32 leaving coke deposits on the catalyst that lower catalyst activity. The spent or coked catalyst requires regeneration for further use.

The FIGURE depicts a regenerator 70 known as a combustor. However, other types of regenerators are suitable. In the catalyst regenerator 70, a stream of oxygen-containing gas, such as air, is introduced through the catalyst distributor 72 to contact the mixed stream of the first spent catalyst stream and the second spent catalyst stream to burn coke deposited thereon, and provide regenerated catalyst and flue gas. Catalyst and air flow upwardly together along a combustor riser 74 located within the catalyst regenerator 70 and, after regeneration, are initially separated by discharge through a regenerator disengager 76. Finer separation of the regenerated catalyst and flue gas exiting the regenerator disengager 76 is achieved using at least one cyclone 78 within the catalyst regenerator 70. Catalyst separated from flue gas dispenses through dip legs from the cyclones 78 while flue gas significantly lighter in catalyst sequentially exits the cyclone 78 and exits the regenerator vessel 70 through flue gas outlet 80. Regenerated catalyst is passed back to and through the first regenerated catalyst conduit 14 to the riser reactor 20 and passed back to and through the second regenerated catalyst conduit 48 to the downer reactor 30. A recycle regenerated catalyst conduit 75 may circulate hot regenerated catalyst through a control valve to a lower chamber of the regenerator 70.

As a result of the coke burning, the flue gas vapors exiting at the top of the catalyst regenerator 70 from the regenerator outlet 80 contain CO, $CO_2$ and $H_2O$, along with smaller amounts of other species. Catalyst regeneration temperature is between about 500° C. (932° F.) and about 900° C. (1652°

F.). Both the cracking and regeneration occur at an absolute pressure below about 5 atmospheres.

The synergetic use of the riser reactor 20 to crack heavier hydrocarbon feed and the downer reactor 30 to crack lighter hydrocarbon feed achieves greater yields of light olefins and gasoline.

Specific Embodiments

While the following is described in conjunction with specific embodiments, it will be understood that this description is intended to illustrate and not limit the scope of the preceding description and the appended claims.

A first embodiment of the invention is a process for catalytically cracking hydrocarbons comprising contacting a fresh hydrocarbon feed stream with an upwardly rising catalyst stream to produce a cracked hydrocarbon stream and a first spent catalyst stream; separating the first spent catalyst stream from the cracked hydrocarbon stream; contacting a second hydrocarbon feed stream with a downwardly falling catalyst stream to produce a light hydrocarbon stream and a second spent catalyst stream. An embodiment of the invention is one, any or all of prior embodiments in this paragraph up through the first embodiment in this paragraph further comprising fractionating the cracked hydrocarbon stream to produce the second hydrocarbon feed stream. An embodiment of the invention is one, any or all of prior embodiments in this paragraph up through the first embodiment in this paragraph wherein the second hydrocarbon stream has a lower boiling point range than the fresh hydrocarbon feed stream. An embodiment of the invention is one, any or all of prior embodiments in this paragraph up through the first embodiment in this paragraph wherein the first spent catalyst stream and the second spent catalyst stream are mixed. An embodiment of the invention is one, any or all of prior embodiments in this paragraph up through the first embodiment in this paragraph further comprising regenerating the first spent catalyst stream and the second spent catalyst stream to produce regenerated catalyst. An embodiment of the invention is one, any or all of prior embodiments in this paragraph up through the first embodiment in this paragraph wherein the upwardly rising catalyst stream comprises the regenerated catalyst. An embodiment of the invention is one, any or all of prior embodiments in this paragraph up through the first embodiment in this paragraph wherein the downwardly falling catalyst stream comprises the regenerated catalyst. An embodiment of the invention is one, any or all of prior embodiments in this paragraph up through the first embodiment in this paragraph wherein the fresh hydrocarbon feed stream is contacted with the upwardly rising catalyst stream in a riser reactor. An embodiment of the invention is one, any or all of prior embodiments in this paragraph up through the first embodiment in this paragraph wherein the second hydrocarbon feed stream is contacted with the downwardly falling catalyst stream in a reactor chamber. An embodiment of the invention is one, any or all of prior embodiments in this paragraph up through the first embodiment in this paragraph further comprising collecting the cracked hydrocarbon stream and the light hydrocarbon stream in a plenum above a disengager for separating the first spent catalyst stream from the cracked hydrocarbon stream.

A second embodiment of the invention is an apparatus for catalytically cracking hydrocarbons comprising a riser comprising a first feed distributor for distributing fresh hydrocarbon feed stream to a riser; a first regenerated catalyst conduit connected with the riser reactor for delivering a first regenerated catalyst stream to the riser for contact with the fresh hydrocarbon feed stream; a disengager connected to an upper end of the riser for disengaging cracked products from spent catalyst; a reactor chamber below the disengager; a second regenerated catalyst conduit connected with the reactor chamber for delivering a second regenerated catalyst stream to the chamber; and a second feed distributor for distributing a second hydrocarbon feed stream to the reactor chamber for contact with the second regenerated catalyst stream. An embodiment of the invention is one, any or all of prior embodiments in this paragraph up through the second embodiment in this paragraph further comprising a regenerator for regenerating spent catalyst and passing regenerated catalyst to the first regenerated catalyst conduit and to the second regenerated catalyst conduit. An embodiment of the invention is one, any or all of prior embodiments in this paragraph up through the second embodiment in this paragraph wherein the disengager comprises a cylindrical wall with a tangentially disposed inlet duct connected to an outlet of the riser and a plenum is disposed above the disengager for collecting product gases. An embodiment of the invention is one, any or all of prior embodiments in this paragraph up through the second embodiment in this paragraph further comprising vent tubes extending from the reactor chamber to the plenum to transport the light hydrocarbon stream to the plenum. An embodiment of the invention is one, any or all of prior embodiments in this paragraph up through the second embodiment in this paragraph further comprising a cyclone with an entry duct connected to the plenum and a dip leg connected to the reactor chamber. An embodiment of the invention is one, any or all of prior embodiments in this paragraph up through the second embodiment in this paragraph further comprising a stripping section at a bottom of the reactor chamber between a catalyst nozzle for the second regenerated catalyst conduit and an outlet for spent catalyst. An embodiment of the invention is one, any or all of prior embodiments in this paragraph up through the second embodiment in this paragraph further comprising a main fractionation column in downstream communication with the disengager.

A third embodiment of the invention is a process for catalytically cracking hydrocarbons comprising feeding a fresh hydrocarbon feed stream to a riser reactor; contacting the fresh hydrocarbon feed stream with an upwardly rising catalyst stream in the riser reactor to produce a cracked hydrocarbon stream and a first spent catalyst stream; separating the spent catalyst stream from the cracked hydrocarbon stream; feeding a second hydrocarbon feed stream to a reactor chamber; contacting the second hydrocarbon feed stream with a downwardly falling catalyst stream to produce a light hydrocarbon stream and a second spent catalyst stream; and collecting the cracked hydrocarbon stream and the light hydrocarbon stream in a plenum above the reactor chamber. An embodiment of the invention is one, any or all of prior embodiments in this paragraph up through the third embodiment in this paragraph further comprising fractionating the cracked hydrocarbon stream to produce the second hydrocarbon feed stream. An embodiment of the invention is one, any or all of prior embodiments in this paragraph up through the third embodiment in this paragraph further comprising regenerating the second spent catalyst stream to produce regenerated catalyst; the upwardly rising catalyst stream comprises the regenerated catalyst and the downwardly falling catalyst stream comprises the regenerated catalyst.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. An apparatus for catalytically cracking hydrocarbons comprising:
    a riser comprising a first feed distributor for distributing fresh hydrocarbon feed stream to a riser;
    a first regenerated catalyst conduit connected with said riser reactor for delivering a first regenerated catalyst stream to said riser for contact with said fresh hydrocarbon feed stream;
    a disengager connected to an upper end of said riser for disengaging cracked products from spent catalyst, wherein said disengager comprises a cylindrical wall with a tangentially disposed inlet duct connected to an outlet of said riser and a plenum is disposed above the disengager for collecting product gases;
    a reactor chamber below said disengager;
    a second regenerated catalyst conduit connected with said reactor chamber for delivering a second regenerated catalyst stream to said chamber;
    a second feed distributor for distributing a second hydrocarbon feed stream to said reactor chamber for contact with said second regenerated catalyst stream; and
    vent tubes extending from said reactor chamber to said plenum to transport a light hydrocarbon stream to said plenum.

2. The apparatus of claim 1 further comprising a regenerator for regenerating spent catalyst and passing regenerated catalyst to said first regenerated catalyst conduit and to said second regenerated catalyst conduit.

3. The apparatus of claim 1 further comprising a cyclone with an entry duct connected to said plenum and a dip leg connected to said reactor chamber.

4. The apparatus of claim 1 further comprising a stripping section at a bottom of said reactor chamber between a catalyst nozzle for said second regenerated catalyst conduit and an outlet for spent catalyst.

5. The apparatus of claim 1 further comprising a main fractionation column in downstream communication with said disengager.

* * * * *